United States Patent
Ciprian Petru et al.

(10) Patent No.: US 11,989,712 B2
(45) Date of Patent: May 21, 2024

(54) METHODS AND APPARATUS FOR ANOMALY DETECTION IN SELF-CHECKOUT RETAIL ENVIRONMENTS

(71) Applicant: EVERSEEN LIMITED, Blackpool (IE)

(72) Inventors: David Ciprian Petru, Blackpool (IE); Dan Alexandru Pescaru, Blackpool (IE); Vasile Gui, Blackpool (IE); Cosmin Cernazanu-Glavan, Blackpool (IE); Andrei Pricochi, Blackpool (IE); Ovidiu Parvu, Blackpool (IE); Bogdan Ciubotaru, Blackpool (IE); Gavin Doyle, Clashanure (IE)

(73) Assignee: EVERSEEN LIMITED, Blackpool (IE)

( * ) Notice: Subject to any disclaimer, the term of this patent is extended or adjusted under 35 U.S.C. 154(b) by 358 days.

(21) Appl. No.: 17/424,838

(22) PCT Filed: Jan. 21, 2020

(86) PCT No.: PCT/EP2020/051433
§ 371 (c)(1),
(2) Date: Jul. 21, 2021

(87) PCT Pub. No.: WO2020/152181
PCT Pub. Date: Jul. 30, 2020

(65) Prior Publication Data
US 2022/0122429 A1    Apr. 21, 2022

(30) Foreign Application Priority Data
Jan. 22, 2019   (EP) ................................. 19153108

(51) Int. Cl.
*G06Q 20/20* (2012.01)
*A47F 9/04* (2006.01)
(Continued)

(52) U.S. Cl.
CPC ............. *G06Q 20/20* (2013.01); *A47F 9/047* (2013.01); *G06F 17/10* (2013.01); *G06Q 20/18* (2013.01);
(Continued)

(58) Field of Classification Search
CPC .... G06Q 20/20; G06Q 20/18; G06Q 20/4016; A47F 9/047; G06F 17/10; G06F 2218/08;
(Continued)

(56) References Cited

U.S. PATENT DOCUMENTS

| | | | | |
|---|---|---|---|---|
| 7,957,565 B1 * | 6/2011 | Sharma | ................... | G06V 20/53 |
| | | | | 382/103 |
| 9,589,433 B1 * | 3/2017 | Thramann | .............. | G07G 3/003 |

(Continued)

OTHER PUBLICATIONS

Patent Cooperation Treaty: International Search Report and Written Opinion for PCT/EP2020/051433; Rabasa Garcia, Carmen; dated Feb. 12, 2020 ; 13 pages.

*Primary Examiner* — Garcia Ade

(57) ABSTRACT

A system for anomaly detection in a self-checkout environment, comprising a processing unit for receiving transaction data from a self-checkout terminal: characterising an activity based on a set of features extracted from the received transaction data; defining a plurality of active intervals for each characterised activity; determining a meta-feature vector for each defined active interval of the plurality of active intervals; comparing each meta feature vector with a predefined set of vectors; and determining an anomaly based on the comparison.

15 Claims, 5 Drawing Sheets

(51) Int. Cl.
*G06F 17/10* (2006.01)
*G06Q 20/18* (2012.01)
*G06Q 20/40* (2012.01)
*G06V 10/764* (2022.01)
*G06V 20/52* (2022.01)
*G07G 1/00* (2006.01)

(52) U.S. Cl.
CPC ....... *G06Q 20/4016* (2013.01); *G06V 10/764* (2022.01); *G06V 20/52* (2022.01); *G07G 1/0009* (2013.01); *G06F 2218/08* (2023.01); *G06F 2218/12* (2023.01)

(58) Field of Classification Search
CPC ............ G06F 2218/12; G06F 18/2431; G06V 10/764; G06V 20/52; G07G 1/0009; G07G 3/00; G07F 17/3241; G07F 19/207; G08B 13/19604; G08B 13/19613
USPC ......................................................... 705/16
See application file for complete search history.

(56) References Cited

U.S. PATENT DOCUMENTS

2010/0134624 A1\* 6/2010 Bobbitt ................ G07G 1/0054
348/150
2010/0135528 A1\* 6/2010 Bobbitt .................. G06V 40/23
382/103

\* cited by examiner

METHODS AND APPARATUS FOR ANOMALY DETECTION IN SELF-CHECKOUT RETAIL ENVIRONMENTS

CROSS-REFERENCE TO RELATED APPLICATIONS

This application is a U.S. National Phase application submitted under 35 U.S.C. § 371 of Patent Cooperation Treaty application serial no. PCT/EP2020/051433, filed Jan. 21, 2020, and entitled METHODS AND APPARATUS FOR ANOMALY DETECTION IN SELF-CHECKOUT RETAIL ENVIRONMENTS, which application claims priority to European patent application serial no. 19153108.6, filed Jan. 22, 2019, and entitled METHOD AND APPARATUS FOR ANOMALY DETECTION IN SELF-CHECKOUT RETAIL ENVIRONMENTS. All of the aforementioned are incorporated herein by reference in their entirety.

TECHNICAL FIELD

The present invention relates to a method and apparatus for anomaly detection in self-checkout retail environments.

BACKGROUND

Increasingly in retail environments self-checkout and automated processes are becoming mainstay. This however comes at a disadvantage as retail environments based on self-checkouts (SCOs) typically cause lower customer flow for a variety of reasons. The consumer or customer typically is not trained on self-checkout mechanisms and is, in many cases not comfortable with the technology. Customer's lack of knowledge and inexperience can slow down the process of checking out and paying for goods. For example, customers may incorrectly execute the scanning process, have to wait for a retail employee to reset the machine or provide authorisation for the transaction or indeed the customer may simply struggle with scanning the relevant barcode. Appreciably, deliberate attempts to avoid transactions also occur. Time loss with waiting for voiding transactions, weighing scales which require calibration and additional non-ideal scenarios cause interruptions. These non-ideal scenarios include non-scans, overcharging, void transactions, etc.

It will be appreciated that customer flow interruptions such as those described above can affect profitability and turnover; considering for example periods of peak activity. Flow interruptions can delay the throughput of customers, may cause backlogs and/or can be off putting to customers whom may otherwise have made some impulse purchases. This in turn has an impact on turnover and reduces the efficiency of the self-check-out systems. Retailers have previously attempted to control the problem by human monitoring of the SCOs, through attendants/operators. The attendant's job generally has two parts: a monitoring component and a decision/action component. The monitoring component is when the attendant is required to observe any irregularities and blockages at the SCOs' and the action component is upon observing an irregularity the attendant attempts to rectify the problem. Appreciably this can also cause irregularity in flow. Attendant typically tend to reset the machine and ignore the fact that a product has not been scanned. This is a loss to the retail owner and can be open to abuse. An irregularity is defined as any activity that does not follow the expected pattern of a purchasing procedure. A purchasing procedure is formed by a chain of actions as pick an object from a certain area, drop an object to a certain area, pass an object through the scanner, pressing buttons or some touch screen area, bagging a product, passing with non-empty cart, etc.

It is therefore required to implement an automated method and apparatus to optimise customer flow.

SUMMARY

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning consistent with the particular concepts disclosed herein.

In one aspect, the present invention provides a system for anomaly detection in a self-checkout environment, comprising a processing unit for extracted a set of features from transaction data received from a self-checkout terminal; characterising an activity based on the set of features; defining a plurality of active intervals for each characterised activity; determining a meta-feature vector for each defined active interval of the plurality of active intervals; comparing each meta feature vector with a predefined set of vectors; and detecting an anomaly based on the comparison.

Characterising the activity may comprise extracting a set of features from the received data, transforming the set of features into the corresponding set of feature activation values and determining an evolution of the set of activation values over a time interval and defining the activity, Activity$^\mu$ in accordance with:

$$\{f_i(n) | i \in \text{featureSet}^\mu, \mu \in [1,K], n \in [N_1,N_2], N_2=N_1+N_a\}$$

where $N_a$ is the number of frames considered to detect the activity $f_i(n)$ is the extracted feature set values featureSet$^\mu$ is the set of features which describes the Activity$^\mu$,

[$N_1$, $N_2$] represents the set of consecutive frames extracted in the time interval between the time of the initial frame N1 and the time of the last frame N2.

The processor may be further configured to estimate the number of frames defining the activity Na. The estimation comprises defining an activation function $A(f_i(n), R_i)$ and segmenting the time domain into active intervals based on the function and wherein $A(f_i(n), R_i)$ is characterised as $$AA(f_i(n), R_i) = \begin{cases} 1, & \text{when } R_i(f_i(n)) \text{ is true} \\ 0, & \text{otherwise} \end{cases}$$

where $R_i$ represents a set of rules defined by the user for each feature $f_i$; $f_i(n)$ is active when $R_i$ is true for a given frame n.

Each active interval for all K activities may be defined as $$\text{ACTIVE}_{[N_1,N_2]}^\mu = \cup\{n\} | \exists A(f_i(n),R_i)=1 \forall n \in [N_1,N_2], \mu \in [1,K]$$

The processor may be further configured to determine a non-active interval between adjacent active intervals.

The processor may be further configured for comprising comparing said non-active interval with a threshold and combining said adjacent active intervals and the non-active interval into a merged active interval.

Determining the meta-feature vector may comprise computing a plurality of statistical measures for each feature $f_i$ in the active intervals and combining said features to form a meta-feature vector for each active interval.

The statistical measures may comprise statistical moments and/or ordered statistics.

The processor may be configured to perform a first comparison between the determined meta-feature vector and a first classification system model and create an alert based on the comparison.

The processor may be configured to perform a second classification comparison between the determined meta-feature vector and a second system model.

The processor may be configured to compare a performance of the first system model and the second system model based on the first and second comparison and replace the first system model with the second system model if the performance of the second system model outperforms the first system model.

The system may further comprise a memory for storing the first system model as a backup model.

The processor may be configured to receive feedback in respect of the alert and to update the second system model based on the feedback.

The processor may be configured to compare a performance of the first system model with a performance of the backup model and replace the first system model with the backup model if the backup model outperforms the first system model.

The system may further comprise a plurality of reporting devices for reporting the alert. The reporting device may be selected from the list including mobile computing devices, mobile communication devices, smart watches, smart glasses, personal computers, networked servers, visual display units and audio output devices. The system may further comprise a POS device.

The system may further comprise a plurality of sensors for sensing transaction data from the self-checkout terminal.

A further embodiment of the invention incorporates a method for anomaly detection in a self-checkout environment, comprising extracting a set of features from transaction data received from a self-checkout terminal; characterising an activity based on the set of features; defining a plurality of active intervals for each characterised activity; determining a meta-feature vector for each defined active interval of the plurality of active intervals; comparing each meta feature vector with a predefined set of vectors; and detecting an anomaly based on the comparison.

The method may further comprise characterising the activity comprises extracting a set of features from the received data, transforming them into the corresponding set of feature activation values and determining an evolution of these set of values over a time interval, and then defining the Activity$^\mu$ in accordance to the following set $$\{f_i(n)|i\in \text{featureSet}^\mu, \mu\in[1,K], n\in[N_1,N_2], N_2=N_1+N_a\}$$

where K represents the total number of activities recorded in system knowledge base, featureSet$^\mu$ is the set of features which describes the Activity$^\mu$, $N_a$ is the number of frames considered to detect the activity, $f_i(n)$ is the extracted feature set values, and $[N_1, N_2]$ represents the set of consecutive frames extracted in the time interval between the time of the initial frame $N_1$ and the time of the last frame $N_2$.

The method may further comprise estimating the number of frames defining the activity Na is estimated and wherein the estimation comprises defining an activation function $A(f_i(n), R_i)$ and segmenting the time domain into active intervals based on the function and wherein $A(f_i(n), R_i)$ is characterised as $$A(f_i(n), R_i) = \begin{cases} 1, & \text{when } R_i(f_i(n)) \text{ is true} \\ 0, & \text{otherwise} \end{cases}$$

where $R_i$ represents a set of rules defined by the user for each feature $f_i$; $f_i(n)$ is active when $R_i$ is true.

Each active interval for all the K activities may be defined as $$\text{ACTIVE}_{[N_1,N_2]}{}^\mu = \cup\{n\}|\exists A(f_i(n),R_i)=1 \,\forall n\in[N_1,N_2], \mu\in[1,K]$$

The method may further comprise determining a non-active interval between adjacent active intervals.

The method may further comprise comparing said non-active interval with a threshold and combining said adjacent active intervals and the non-active interval into a merged active interval.

The method may further comprise wherein determining the meta feature vector comprises computing a plurality of statistical measures for each feature $f_i$ in the active intervals and combining said features to form a meta-feature vector for each active interval.

The statistical measures may comprise statistical moments and/or ordered statistics.

The method may comprise performing a first comparison between the determined meta-feature vector and a first classification system model and creating an alert based on the comparison.

The method may comprise performing a second classification comparison between the determined meta-feature vector and a second system model.

The method may comprise comparing a performance of the first system model and the second system model based on the first and second comparison and replace the first system model with the second system model if the performance of the second system model outperforms the first system model.

The method may further comprise storing the first system model as a backup model.

The method may further comprise receiving feedback in respect of the alert updating the second system model based on the feedback.

The method further comprises comparing a performance of the first system model with a performance of the backup model and replacing the first system model with the backup model if the backup model outperforms the first system model.

There is also provided a computer program comprising program instructions for causing a computer program to carry out the above method which may be embodied on a record medium, carrier signal or read-only memory.

BRIEF DESCRIPTION OF THE DRAWINGS

Embodiments of the invention will be described, by way of example only, with reference to the accompanying drawings in which.

DETAILED DESCRIPTION

Figure 1:
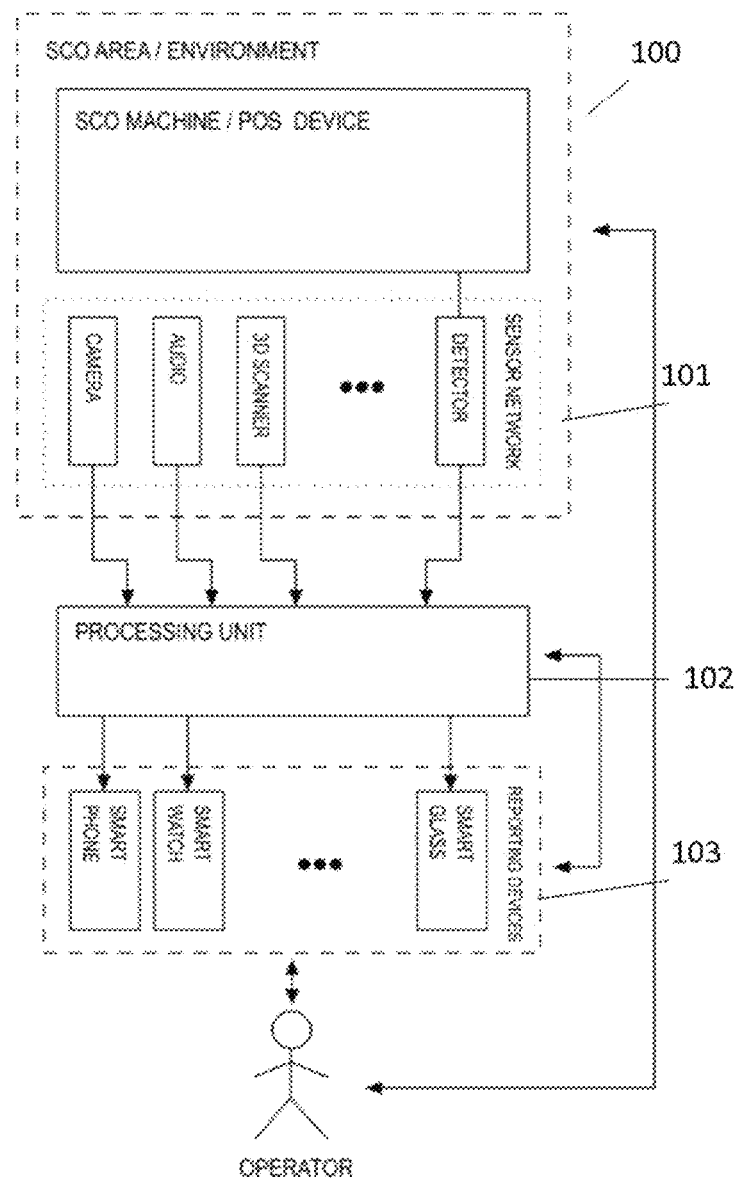
FIG. 1 depicts a self-checkout environment in accordance with an embodiment of the invention.

In accordance with an embodiment of the invention there is provided a self-checkout environment 100, a processing unit 102 and a reporting mechanism 103. The reporting mechanism comprises a plurality of reporting devices.

The self-checkout environment includes a point of sale device or self-checkout machine and a sensor network 101. The sensor network comprises a plurality of sensors. Sensors may include camera(s), audio sensor(s), 3D scanner(s) and the like. These sensors can include any sensor that can extract information relevant to the retail transaction such as barcodes, QR codes, audio associated with the transaction, video or still imagery etc. During the transaction, transaction data is extracted at the sensor network (101) and provided to a processing unit (102). Transaction data includes transaction data such as barcodes, QR code, audio recorded during the transaction, video of the transaction and still imagery. Transaction data is that data which is relevant to the transaction.

The processing unit (102) can be located in the retail environment or may be remote from the retail environment for example at a central hub. The central hub may be networked to a plurality of retail environments. For example, a central hub may be responsible for processing data from a plurality of retail sites, a chain of retailers, etc. The processing unit processes the data from the sensor network. In response to the processing alerts or information messages can be reported to a plurality of reporting devices 103. These reporting devices can include online reporting devices such as computing terminals such as machines, remote units, personal computing devices, wireless communication devices, smart watches, smart glasses, pagers etc. Reporting devices can also include a number of offline reporting devices including database servers, cloud servers etc. Both the online and offline reporting devices are connected through a secure network. These information messages can be provided to one or more of these devices, for example to an operator 104 and/or a supervisor or management. Additionally reporting may be addressed to the customer, for example to warn the customer of a detected anomaly. It will be appreciated that instructions may be provided to the customer to correct the anomaly. Reporting messages could be pre-recorded standard phrases using an audio output and/or written messages for example on the SCO display. This type of customer reporting would minimise the need for an operator and thus maintain flux. However usefulness is limited in fraudulent situations. Alternatively with operator alerts when an incident is detected and operator intervention is required a message can be issued with information as outlined above.

Figure 2:
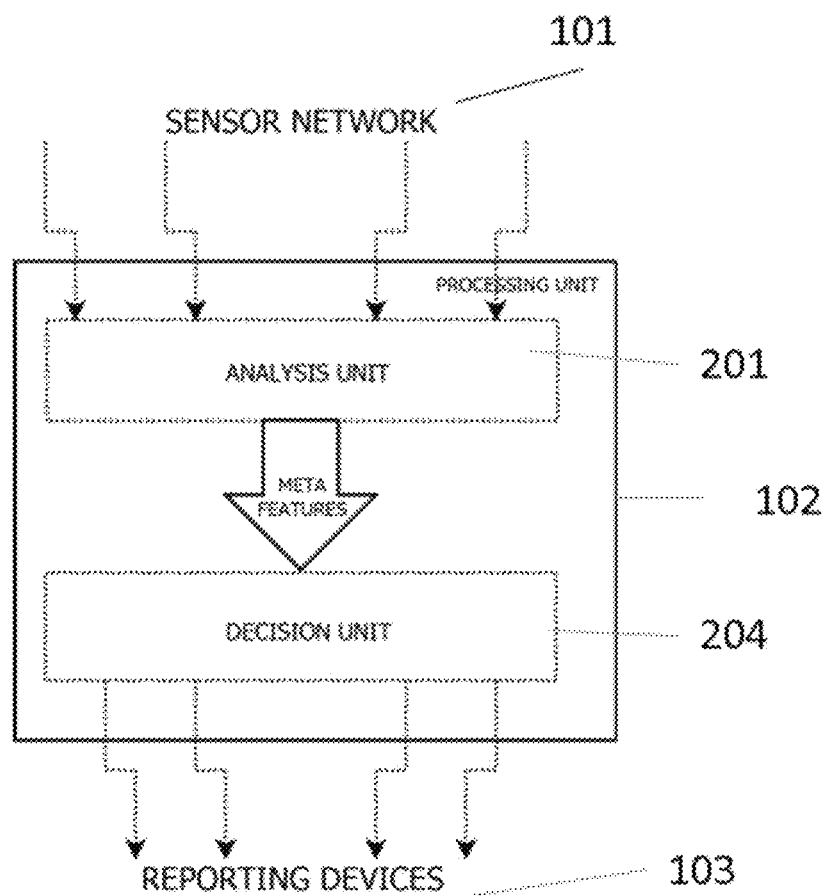
FIG. 2 is a flow diagram depicting an example of a processing unit in accordance with an embodiment of the invention.

The processing unit of FIG. 2 includes an analysis unit 201 and a decision unit 204. While shown as separate units it will be appreciated that these units may be combined into a single unit. The sensor network extracts that data which can be used to characterise the retail transaction. This extracted data is transaction data and is collected by the sensors installed in the point of sale environment 101. This transaction data includes data such as barcodes, QR codes, audio recorded during the transaction, video of the transaction and still imagery. By analysing the data the steps of the retail process can be recognized. Steps include for example picking a product, scanning a product or bagging a product. This data is passed to the analysis unit 201 which processes the data. The processing of the data is used to extract meta-features from the data. This information is then passed to the decision unit. The decision unit makes a decision as to the existence of an irregularity in the data. Once a decision as to an irregularity has been made, an alert or information message is sent to the relevant reporting device. The relevant reporting device can be preselected and individually configured for each retail environment. The information message may be simply an alert about an irregularity. Additionally, information may be provided about the irregularity type to enable ease of detection.

As outlined above, the information message is provided via a network of online and offline devices. It will be appreciated that communication with the online and offline devices can optionally be bidirectional with one or all of the devices. The bidirectional devices can be used by the operator to provide feedback concerning the received information message. The feedback may comprise a confirmation/rejection of the alert. Feedback is sent by the reporting device to the decision unit (204). The feedback is used to adapt the algorithm. This adaptive algorithm improves accuracy, robustness to false positives and speed of detection. Feedback, for example, occurs when an alert is issued but the attendant's assessment indicated a false positive. Relevant system data is input so that the adaptive component of the models can be updated.

It will also be appreciated that an attendant or operator can provide unprompted feedback. For example, where there is no alert or message provided, but an irregularity is detected by the operator, feedback can be provided. This information can be used to create a new alert or instance of a problem. Feedback can also be provided of the attendant's intervention in the retail flow including the time taken, the action taken and the impact on the flow.

Figure 3:
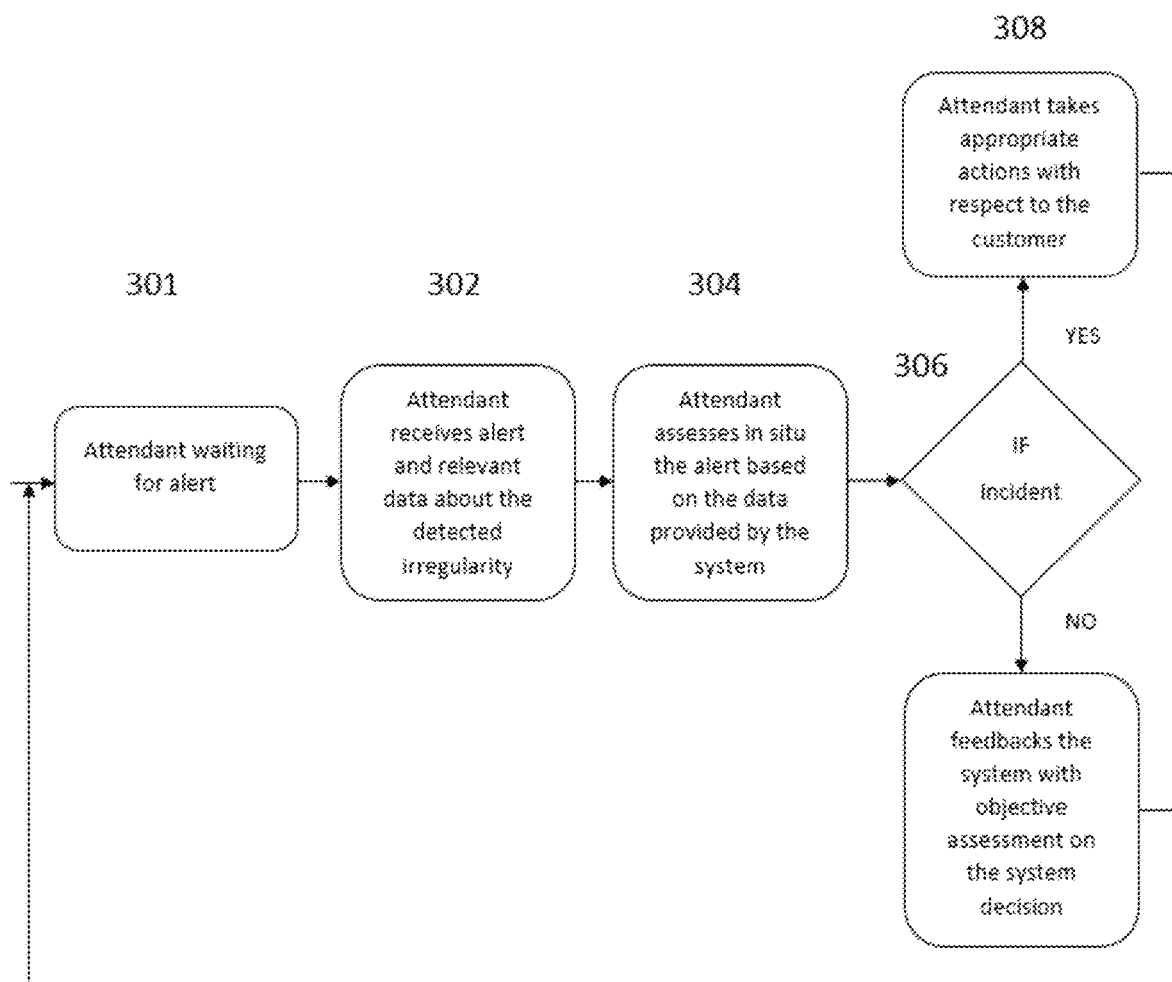
FIG. 3 is a flow diagram depicting an example of an attendant decision process in response to an alert.

For example, an attendant monitoring a self-checkout at step 301 of FIG. 3 will await an alert. The attendance will receive the alert and optionally relevant data about the detected irregularity 302. Based on the alert and the information, the attendant assesses the alert and makes a decision 306 as to whether or not there is an incident. If an incident is detected the attendant takes the appropriate actions with respect to the customer 308 and provides relevant feedback. If there is no incident, the attendant provides feedback 310 with an objective assessment on the reasoning behind their decision.

Another example, this time concerning the reporting addressing the customer, consists of providing some pre-recorded standard phrases using an audio output and/or written messages on the SCO display. Such messages guide the customer on the retail process (e.g. "Please rescan the product!"). This type of reporting would minimise the need for an operator and thus maintain the flow.

The method described in relation to FIG. 3 aims at replacing and assisting in the decision and action components of the operator and assistant.

Extraction of meta-features provides a basis for the decision of whether or not there is a suspicious event or an irregularity in the self-checkout flow. Feedback as described above is used to construct and adapt the decision model to include new instances and cases of irregularity and can be used to increase accuracy.

Further detail regarding the irregularity or anomaly detection mechanism is described below.

As outlined in relation to FIG. 1, information or transaction data is obtained from the plurality of sensors. This information can include for example video data which provides a stream of images associated with the retail and self-checkout process. The method described below describes video data however any data may be used.

For each video frame (n), the output of one or more sensors of the sensor network is sampled to extract a set of features $f_i(n)$, i=1, 2, 3, . . . , K from the transaction data at a discrete time n. It will be appreciated that the sensor network monitors a plurality of activities concurrently. Features for example can include a percentage of foreground pixels in a video frame, a number, orientation of motion vectors in a particular area of a video frame, or a number of key-points existing in a region of interest in a video frame. Meta-features are obtained based on a feature variation over a time interval by applying a statistical function to the feature, e.g. statistical moments (mean, variance, skew, kurtosis, etc.) or ordered statistics (minimum, maximum, median, quartile, trimmed mean, median of absolute deviations, etc Having Y features, a number of N×Y statistics measures will be computed and encoded into the meta-feature vector. Each Activity$^\mu$ is characterised by a pre-defined subset of features featureSet$^\mu$ and a set of meta features values corresponding to this subset. Therefore when a particular activity is occurring or in progress, the corresponding subset of features will be detected as active by the sensor network, based on the non-zero value of the activation function. Different activities will correspond to different subsets of features. The actual features subset selected is dependent on the activity that is detected. The activity is therefore characterised based on its set of features. These features are represented by information relevant for solving a certain task related to an application. They may be selected manually or automatically. Automatic selection can be implemented using neural networks or other machine network techniques. Features are therefore represented by the values of one variable or a group of variables. In our application, features can be extracted from the video (e.g. skin detection, motion detection, patterns of motion detection, foreground/background detection, body part detection, etc.), others can be generated by sensors (e.g. detection of scan related sounds, till information, etc.). These features can be of different complexity levels, from a computational effort point of view. Low level features are represented by features extracted directly from sensors or features that are obtained by simple computer vision algorithms (usually these simple features are obtained at pixel level). Low level feature examples: detected edges, detected lines, detected skin pixels, dominant colours, the presence of a specific sound, time stamp of a scan, signals extracted from the scan machine, etc. Higher level features can be obtained by combining low level features applying a specific algorithm.

Example of features extracted from specific ROIs (Region of Interest):
- presence/absence of a hand
- percentage of foreground pixels
- percentage of motion vectors with projection on a given direction exceeding a specified threshold
- dominant motion vector direction within specified angle range The activity occurring in the time interval between two subsequent frames N1 and N2, denoted $[N_1, N_2]$ can be characterized by the evolution of the feature set, $f_i(n)$, in accordance with the following:

$$\{f_i(n) | i \in \text{featureSet}^\mu, \mu \in [1,K], n \in [N_1, N_2], N_2 = N_1 + N_a\},$$

where K represents the total number of activities recorded in system knowledge base, featureSet$^\mu$ is the set of features which describes the Activity$^\mu$, $N_a$ is the number of frames considered to detect the activity, $f_i(n)$ is the extracted feature set values, and $[N_1, N_2]$ represents the set of consecutive frames extracted in the time interval between the time of the initial frame $N_1$ and the time of the last frame $N_2$. The frame numbers $N_1$ and $N_2$ are specific for each activity. Therefore, before performing the meta feature vector computation, the active interval $[N_1, N_2]$ should be determined iteratively for each activity stored by the model. It can be determined based on active interval detection method. Indeed, this interval depends on the specific subset of features determined by the activity.

It will be appreciated that the number of frames estimated to define each feature varies, i.e. $N_a$ is variable, i.e. not a constant. $N_a$ will vary from person to person and indeed for a single person repeating a single activity. Each product scan for a single person may vary over the course of checking out a number of products. A sliding window approach, with constant Na, would produce many errors as the window size is not optimised for the transaction. The suboptimal window size leads to errors in activity detection.

To optimise the window size and therefore improve the efficiency of the detection mechanism the following is proposed herein:
- estimate the optimal window size
- (ii) define time domain features normalized with respect to the window size Estimating $N_a$ Considering again the feature set $f_i(n)$ extracted to characterise the activity:

For every feature set $f_i(n)$ an activation function is defined.

$$A(f_i(n), R_i) = \begin{cases} 1, & \text{when } R_i(f_i(n)) \text{ is true} \\ 0, & \text{otherwise} \end{cases} \quad \text{(i)}$$

where $R_i$, represents a set of rules defined by the user for each feature $f_i$; $f_i(n)$ is active when $R_i$ is true.

For example the user defined rules may be as follows:

$$f_i(n) \leq \text{value} \quad \text{(i)}$$

$$\text{value}_1 \leq f_i(n) \leq \text{value}_2 \quad \text{(ii)}$$

$$|f_i(n)| < 0 \quad \text{(iii)}$$

Considering the equations i to iii, "value, value1, value2" define limits for the features. Supposing that features $f_i(n)$ are normalized to take values between 0 and 1, value=0.5 would generate a rule to activate the feature $f_i(n)$ only when $f_i(n)$ takes on a value lower than half of its maximal span. Equation (ii) activates the feature only when it takes on a value in between value1 and value2. The limits like value1 and value2 are set in the design process, using standard machine learning methods or by trial and error.

For each feature $f_i$ the activation function $A(f_i(n), R_i)$ is used to segment the time domain into activation intervals (the A function has a value of 1 during an interval). Each active interval for all the K activities may be defined as $$\text{ACTIVE}_{[N_1, N_2]}^\mu = \cup \{n\} | \exists A(f_i(n), R_i) = 1 \forall n \in [N_1, N_2], \mu \in [1, K] \quad \text{(i)}$$

Figure 4A:
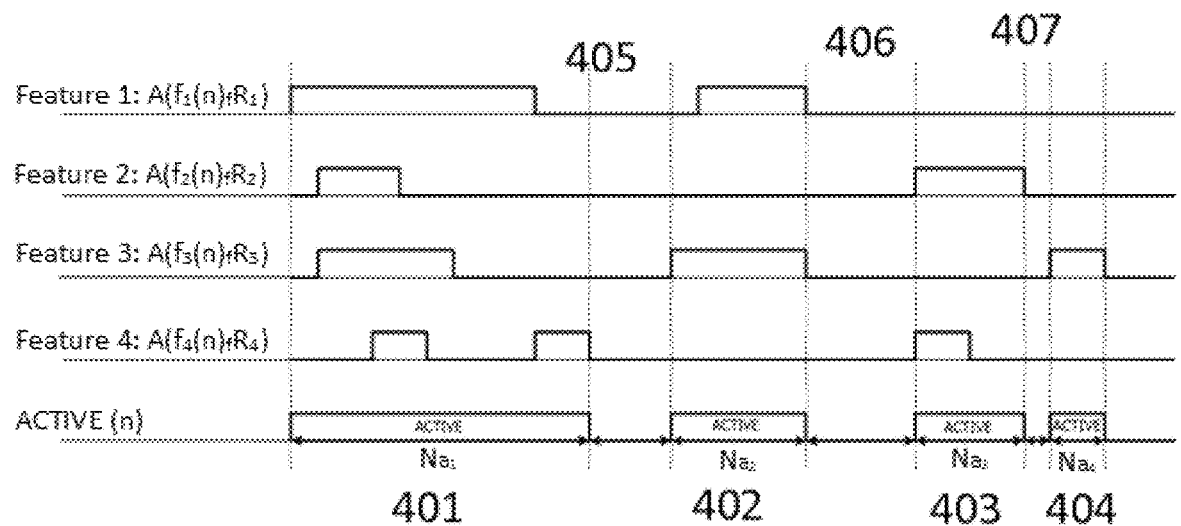
FIGS. 4A and B provide a pictorial view of Active Intervals in accordance with the invention.

As illustrated in FIG. 4a as an example, four features are considered, feature 1, feature 2, feature 3 and feature 4. FIG.

4A shows four feature tracks with each track representative of the evolution of the function, $A(f_i(n), R_i)$. Four active intervals 401, 402, 403, 404, are shown. Gaps, i.e. non-active intervals between adjacent active intervals 405, 406, 407 are also shown. These gaps result due to noise in the system.

For feature 1 in the first active interval 401, feature 1 is detected once. In the second active interval 402, feature 2 is detected once for a shorter time period. Feature 1 is not detected in the third 403 or fourth 404 active interval.

Feature 2 is detected once in the first active interval 401 and again in the third 403 active interval. Feature 2 is not detected in the second 402 or fourth 404 active interval.

Feature 3 is detected in the first 401, second, 402 and fourth 404 active interval with no detection of feature 3 in the third 403 interval.

Considering the feature track for feature 4, there are two activation intervals. In the first active interval 401 the feature 4 is detected twice. Feature 4 is detected against 404.

The varying length of the Active Intervals for each activity is visible in FIG. 4a. The intervals may be pre-defined having predefined thresholds for activity detection based on a determination into the intervals normally associated with routine checkout activities. The gaps may be varied in size. For example gap 407 is smaller than gap 405.

Figure 4B:
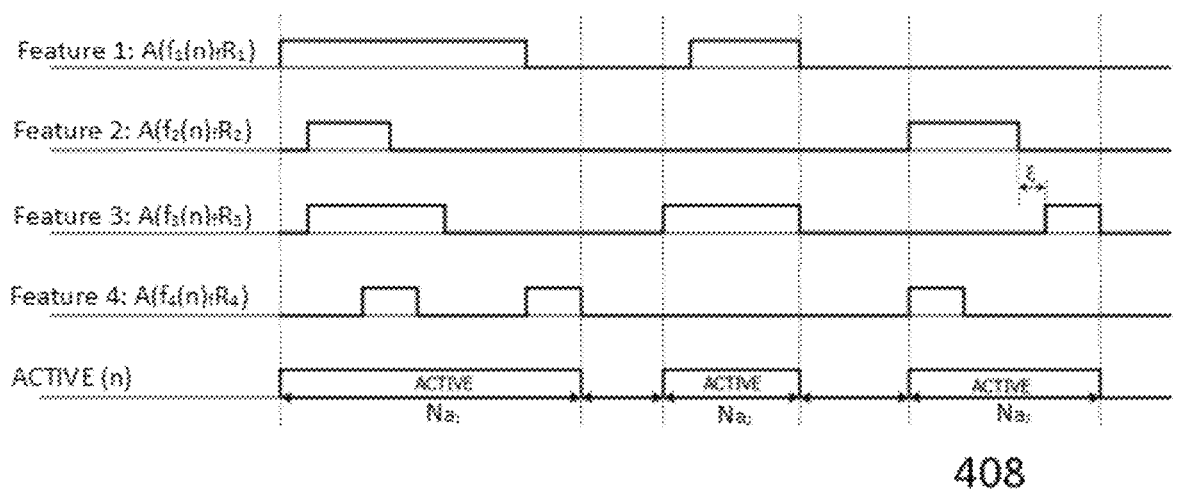

In order to eliminate small gaps or non-active intervals a "relaxed union" of intervals is performed to merge two active intervals into one single interval as shown in FIG. 4b and in particular with respect to gap interval 407 which is merged in FIG. 4b, such that Active Interval 403 and 404 are merged into a single activity interval 408.

To determine the merged interval, the gap between active intervals is compared to a threshold value $\tau^-$, The optimal value for $\tau$ (the threshold for the gap) is determined using a database of extracted activity intervals. The value for $\tau$ is obtained as the one maximising the subsequent classifier accuracy. This is done through experimentation. A valid gap for relaxed union is considered as one which is smaller than the threshold (e.g. 300 ms). Larger gaps cannot be included in an active interval. The threshold can be learned (by any existing methods) or can be found by experiments.

Figures 5, 6:
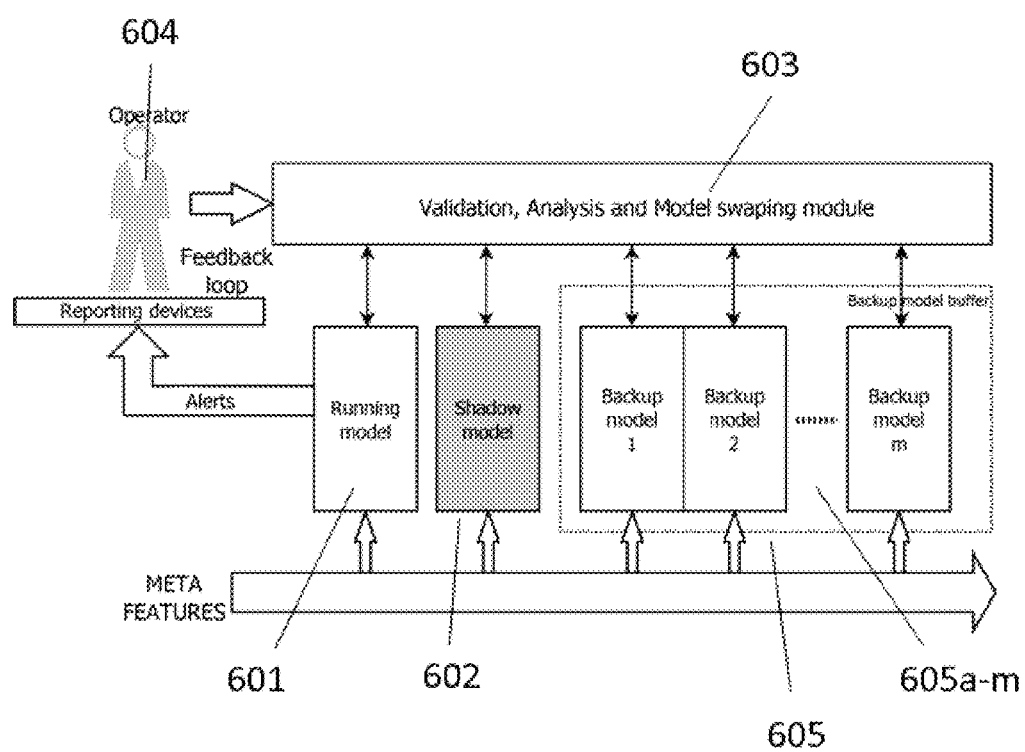
FIG. 5 is a meta-feature vector in accordance with the present invention.
FIG. 6 shows a classification and reporting model in accordance with an embodiment of the present invention.

For each ACTIVE INTERVAL a meta-feature vector is defined as shown in FIG. 5. The meta-feature vector encapsulates the relevant information about the activity during the ACTIVE INTERVAL into a fixed size vector. This vector is then used to detect or classify the activity.

For every feature $f_i$ a set of N statistical measures are computed. A statistical measure is calculated by applying a function to the values of the items of the feature, $f_i$. Examples of statistical measures are (but not limited to): statistical moments (mean, variance, skew, kurtosis, etc.) and ordered statistics (minimum, maximum, median, quartile, trimmed mean, median of absolute deviations, etc.).

Having Y features, a number of N×Y statistics measures will be computed and encoded into the meta-feature vector for every ACTIVE interval. This meta-feature represents the input of the activity detector. As shown in FIG. 5 an example of a set of statistical measures for a feature set having four features is shown. The meta-vector is formed from each of the active intervals shown in FIG. 4. As shown in FIG. 5, the vector is formed from the mean of each of the features in the interval, the variance of each of the features in the interval and the skew of each of the feature. Additional features may be incorporated such as the kurtosis.

Based on the meta-feature vector, the decision unit then determines whether or not an alert should be issued. The decision unit compares the determined meta-feature vector with a predefined set of vectors or classification model and detects an anomaly based on the comparison. Initially a classifier classifies the input data into defined output categories based on a mathematical model obtained through a supervised learning process. As part of the learning process the mathematical model is provided with pairs of inputs to obtain corresponding output data. The model will therefore represent a collection composed of a set of meta-features, a set of use cases and a correspondence between the meta-features and the set of use cases. Based on feedback as outlined above, the model is adjusted to maximise the classification accuracy by a minimisation of an error function of the model.

Further detail of the processing unit of FIG. 1 is depicted in FIG. 6.

Within the processing unit two types of models are used for classification: a running model, or first model 601 and a shadow or second model 602. Meta-feature vectors as described above are input to the running model 602, the shadow model 603, and one or more backup models 605a-m. The running model 602 represents the model or predefined meta-data vectors in use for an active decision. During classification as outlined above this model is frozen, namely it cannot be changed.

To maintain robustness in the system a shadow model 602 is developed in parallel and is based on the running model decisions made and the operator or system feedback.

Feedback is provided to the validation and analysis module 603 which is also responsible for swapping of the models as described further below. It is notable that the shadow model has no influence on the decision. The shadow model is used however to validate the decision made using the running model.

To validate the decision a comparison is made between the results of the shadow model and the results of the running model.

When the shadow model outperforms the running model, the validation, analysis and model swapping module 603 swaps the shadow model with the running model. The shadow model becomes the running model. The running model which is being replaced is saved as a backup model 605a-m. Backup models are previous running modules stored in a backup model buffer. A backup model may be restored as the running model as outlined below. The validation, analysis and model swapping module may be implemented by one or more processors.

The performance of the shadow model is evaluated over a number $N_f$ of feedback cycles. Each time feedback is received from the operator 604 to the validation, analysis and model swapping module, the shadow model is updated and the performance of the shadow model and the running model evaluated. Evaluation is based on the percentage of decision invalidations over the $N_f$ cycles. $N_f$ is varied depending on a desired accuracy of the system. A smaller number of $N_f$ will result in faster adaptability. A larger number of $N_f$ will result in more reliability at the expense of speed. Sample figures for $N_f$ include: (a) for a faster adaptability it can be considered equal with the feedbacks collected over 1 day up to 1 week, (b) while for more reliability, a value greater than the feedbacks collected over 1 month may be chosen.

Considering three separate cases resulting from a performance evaluation:

In a first case the running model remains active. The shadow model is updated based on the received feedback (meta-features of the active interval added to the training set of the shadow model). The shadow model is trained with the updated training set.

In a second case, the running model is swapped with the shadow model when the performance of the shadow model outstrips the performance of the running model. The running model is stored in a backup model buffer and the shadow model becomes the running model.

In the third case the running model is changed with a backup model. This happens when a backup model outperforms the running model.

The backup models are kept in a buffer using a last recently used mechanism. It will be appreciated that maintaining backup models provides flexibility in coping with variations in retail environment such as variations in illumination, time of day, etc. Thus the system is optimised. The classification starts from an optimal point and the best performing model is used. It is easier and more efficient to switch between the backup model and the running model than to train a new model.

Once the running model is used to classify an anomaly as described above, an alert(s) is/are transmitted as outlined above.

The combination of features disclosed above provide for a consistently updatable model which improves anomaly detection in self-checkout retail environments through a consistent and replicable detection, training and optimisation process as described above.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A system for anomaly detection in a self-checkout environment, comprising:
a processing unit configured for:
extracting a set of features from transaction data received from a self-checkout terminal;
characterising an activity based on the set of features;
defining a plurality of active intervals for each characterised activity;
determining a meta-feature vector for each defined active interval of the plurality of active intervals;
comparing each meta-feature vector with a predefined set of vectors;
detecting an anomaly based on the comparison; and
issuing an alert based on detecting the anomaly.

2. The system of claim 1, wherein for characterising the activity the processing unit is configured for:
extracting a set of features from the received data,
transforming the set of features from the received data into the corresponding set of feature activation values,
determining an evolution of the set of feature activation values over a time interval, and
defining the activity, Activity$^\mu$ in accordance with:

$$\{f_i(n) | i \in \text{featureSet}^\mu, \mu \in [1,K], n \in [N_1,N_2], N_2 = N_1 + N_a\},$$

where $N_a$ is a number of frames considered to detect the activity;
$f_i(n)$ is an extracted feature set values;
featureSet$^\mu$ is a set of features which describes the Activity$^\mu$; and
$[N_1, N_2]$ represents a set of consecutive frames extracted in the time interval between a time of an initial frame N1 and a time of a last frame N2.

3. The system of claim 2, wherein:
the processing unit is further configured for estimating the number of frames defining the activity Na,
the estimation comprises:
defining an activation function $A(f_i(n),R_i)$, and
segmenting a time domain into active intervals based on the activation function, and
$A(f_i(n),R_i)$ is characterised as $$A(f_i(n), R_i) = \begin{cases} 1, & \text{when } R_i(f_i(n)) \text{ is true} \\ 0, & \text{otherwise} \end{cases}$$

where $R_i$ represents a set of rules defined by a user for each feature $f_i$; $f_i(n)$ is active when $R_i$ is true.

4. The system of claim 3, wherein each active interval for all activities is defined as $$\text{ACTIVE}_{[N_1,N_2]}^\mu = \cup\{n\} | \exists A(f_i(n),R_i) = 1 \, \forall n \in [N_1,N_2], \mu \in [1,K].$$

5. The system of claim 4, wherein the processing unit is further configured for determining a non-active interval between adjacent active intervals.

6. The system of claim 5, wherein the processing unit is further configured for:
comparing the non-active interval with a threshold, and
combining the adjacent active intervals and the non-active interval into a merged active interval.

7. The system of claim 6, wherein for determining the meta-feature vector the processing unit is further configured for:
computing a plurality of statistical measures for each feature $f_i$ in the active intervals, and
combining the features to form a meta-feature vector for each active interval.

8. The system according to claim 1, wherein the processing unit is further configured for:
performing a first comparison between the determined meta-feature vector and a first classification system model, and
creating the alert based on the first comparison.

9. The system according to claim 8, wherein the processing unit is configured for performing a second classification comparison between the determined meta-feature vector and a second classification system model.

10. The system according to claim 9, wherein the processing unit is configured for:
comparing a performance of the first classification system model and the second classification system model based on the first and second comparison, and
replacing the first classification system model with the second classification system model if a performance of the second classification system model outperforms the performance of the first classification system model.

11. The system according to claim 10, further comprising a memory configured for storing the first classification system model as a backup model.

12. The system of claim 11, wherein the processing unit is configured for:
   receiving feedback in respect of the alert, and
   updating the second classification system model based on the feedback.

13. The system according to claim 11, wherein the processing unit is configured for:
   comparing the performance of the first classification system model with a performance of the backup model, and
   replacing the first classification system model with the backup model if the backup model outperforms the first classification system model.

14. A method for anomaly detection in a self-checkout environment, comprising:
   extracting a set of features from transaction data received from a self-checkout terminal;
   characterising an activity based on the set of features;
   defining a plurality of active intervals for each characterised activity;
   determining a meta-feature vector for each defined active interval of the plurality of active intervals;
   comparing each meta-feature vector with a predefined set of vectors;
   detecting an anomaly based on the comparison; and
   issuing an alert based on detecting the anomaly.

15. A computer readable programmable medium carrying a computer program stored thereon which when executed by a processing model implements the method according to claim 14.

\* \* \* \* \*